United States Patent [19]

Jensen et al.

[11] 4,305,418

[45] Dec. 15, 1981

[54] FLUID FLOW CONTROL VALVE

[75] Inventors: Tor A. Jensen, Fribourg; Bengt Berglund, Forel, both of Switzerland

[73] Assignee: Spiro Investment S.A., Bösingen, Switzerland

[21] Appl. No.: 43,025

[22] Filed: May 29, 1979

[30] Foreign Application Priority Data

May 30, 1978 [GB] United Kingdom ............... 24523/78

[51] Int. Cl.³ .......................................... F16K 31/122
[52] U.S. Cl. ...................................... 137/219; 251/57; 251/63.5
[58] Field of Search ....................... 137/219, 221, 222; 251/57, 63.6, 63.5, 142; 236/49

[56] References Cited

U.S. PATENT DOCUMENTS

| 856,981 | 6/1907 | McCarroll | 251/57 |
| 2,055,347 | 9/1936 | Hackman | 251/57 X |
| 2,357,527 | 9/1944 | Lundquist | 251/63.6 |
| 3,415,486 | 12/1968 | De Frees | 251/63.6 X |
| 4,082,114 | 4/1978 | Hantke | |

FOREIGN PATENT DOCUMENTS

| 1817272 | 6/1970 | Fed. Rep. of Germany | 137/220 |
| 1341583 | 9/1963 | France | 137/220 |
| 637650 | 4/1962 | Italy | 137/220 |
| 360727 | 11/1931 | United Kingdom . | |
| 418812 | 10/1934 | United Kingdom . | |
| 1025481 | 4/1966 | United Kingdom . | |
| 1099721 | 1/1968 | United Kingdom . | |
| 1175078 | 12/1969 | United Kingdom . | |
| 1356444 | 6/1974 | United Kingdom . | |

*Primary Examiner*—Arnold Rosenthal
*Attorney, Agent, or Firm*—Spencer & Kaye

[57] ABSTRACT

An air flow control valve, for example for control of air of a ventilating flow in a vertilation system comprises an axially extending valve casing having a venturi-shaped inner face, and an axially movable valve member movable within said valve casing to vary the air flow through the valve. In order that the control movement of the valve member may vary the volume of air flow through the valve according to the same predetermined function regardless of the pressure drop across the valve, or the system in which it is incorporated, the valve casing is shaped to compensate for the variation of the drag coefficient of the valve resulting from movement of the valve member. The invention also comprises a method for determining the required dimensions of a valve casing incorporating such correction.

10 Claims, 5 Drawing Figures

| Pos. 1/1 | $P - 1(1V)^2$ | $1V - \sqrt{P}$ | $L = 1$ |
| Pos 1/2 | $P - 4(0.5V)^2$ | $0.5V - \sqrt{\frac{P}{4}}$ | $L = 0.5$ |
| Pos 1/4 | $P - 16(0.15V)^2$ | $0.25V - \sqrt{\frac{P}{16}}$ | $L = 0.25$ |
| Pos 1/8 | $P - 64(0.125V)^2$ | $0.125 - \sqrt{\frac{P}{64}}$ | $L = 0.125$ |

FLUID FLOW CONTROL VALVE

BACKGROUND OF THE INVENTION

This invention relates to fluid flow valves. More particularly, the invention relates to damper valves for controlling air flow in the ducts of ventilating systems.

Numerous kinds of control valves have been used in ventilating and other systems, and these include iris and butterfly valves. Most of these valves lack the advantage of simplicity of operation, and involve disadvantages such as high noise levels during operation in intermediate positions, and irregular control of the volume of air flow in relation to the control movement of the valve.

SUMMARY OF THE INVENTION

It is an object of the present invention to provide a fluid flow valve which has simple operating characteristics, in which the variation in air flow at any given pressure drop across the valve is a predetermined function of the control movement of the valve member, and in which the disadvantage of exhibiting high noise levels in intermediate positions is at least reduced.

According to the present invention there is provided a valve for controlling air flow through a duct, the valve comprising an axially-extending valve casing having a venturi-shaped inner face which widens outwardly from the air inflow end to an air outflow end, and an axially movable valve member which is of convex form towards the air inflow end, said valve member being movable from a fully open position at the air outflow end of said casing towards said inflow end in order to reduce airflow through said valve, and said inner face being so shaped that the variation in areal opening of the valve in relation to the axial movement of said valve member is compensated to take account of the change in the drag coefficient of the valve with axial movement of the valve member, in such a manner that for any constant pressure drop across the valve within a given range the variation in the volume of air flow through the valve in accordance with the axial position of the valve member follows the same predetermined function.

The said predetermined function may be a linear, logarithmic, or square function, depending upon the correspondingly required control movement of the valve member, which may vary for example in dependence upon whether the valve member is to be manually or servoactuated. Preferably, however, the said function is also modified to take account of the $\beta$ value of the system in which the valve is to be installed. As is known in the operation of hydraulic control valves, the $\beta$ value of a system is the relationship between the pressure drop across a valve and the pressure drop across the system including the valve together with the conduit in which the valve is connected. The correction of valve characteristics to match a given $\beta$ value is well known in the art of hydraulic control valves, although hitherto known valve constructions for use in air flow control systems have not allowed of sufficiently precise correction of the valve characteristics to enable such a correction to be made. The valve in accordance with the present invention therefore has the considerable advantage of enabling correction for $\beta$ value to be made.

Moreover, since the arrangement of the valve in accordance with the present invention provides a variation in air flow which is the same function of the control movement of the valve regardless of the pressure drop across the system including the valve, the valve is particularly suitable for use in an installation requiring the connection of several such valves in parallel, for example in controlling the supply of air flow through branched ducts to individual diffuser outlets of a ventilating or central heating system. In such systems the air source generally provides a constant flow, and therefore the adjustment of any one of a number of valves connected in parallel will alter the pressure drop across the remaining valves. In valves of hitherto known type the variation of the pressure drop across the valve requires complex adjustment of the valve setting to compensate for the variation in pressure drop. In a valve in accordance with the present invention, on the other hand, a variation in the pressure drop caused by an adjustment elsewhere in the system alters the volume of flow of air through the valve but does not effect the relative setting of the valve within the range between its maximum and minimum opening positions. The control of the valve setting is therefore essentially simplified, and the valve is especially suitable, for example for servo-actuation in automatically controlled ventilating and other systems.

The valve in accordance with the invention may be adapted to serve for the control of air flow over a predetermined range of settings, without complete closure of the valve. Preferably, however, the valve has an effective range of settings between a fully open and a fully closed position, in which case the said valve casing has a valve seating at the air inflow end, the said valve member being arranged for movement into engagement with said seating to fully close the valve.

To enable relatively linear control of the valve between its fully closed and its fully open positions, the cross-sectional area of the air inflow end of said valve casing is preferably approximately half that of the cross-sectional area of the outflow end, and substantially equal to the effective cross-sectional area of the said valve member.

For optimum stability of the valve in use, the effective angle of taper of said venturi-shaped inner face is preferably relatively small. For example, considering an imaginary cone the central axis of which corresponds with the axis of movement of the valve member, and which passes through the peripheries of the inflow and outflow ends of the valve casing respectively, the angle of the apex of the cone should preferably be less than 30°, and most preferably in the region of 8°.

Although the shape of the valve casing of a valve in accordance with the present invention could possibly be adjusted to derive the desired compensation of the variation in areal opening by trial and error, such an adjustment would be extremely tedious, and very time consuming. In accordance with a preferred embodiment of the invention, there is provided a method of constructing a valve in accordance with the invention, characterised in that, starting with a valve of the construction defined and having an approximated shape of valve casing before compensation of the said shape, firstly the pressure drop across the exit of the valve member in the fully open position is determined for unit volume air flow at the valve entrance, secondly the wanted pressure drops across the compensated valve in relation to said determined pressure drop for a range of other control positions of the valve member are calculated, for the same unit volume air flow, and then the dimensions of the remainder of said valve casing required in relation to the dimension of the outflow end to give the desired relationship of pressure drops is subsequently determined.

Advantageously, the steps of determining the pressure drop across the approximated fully open valve, and the step of determining the dimensions of the valve casing required to give the wanted pressure drops are carried out mathematically utilizing at least the most significant variable factor of the drag coefficient of the valve. The calculation of the wanted dimensions of the valve casing may be effected by means of a successive approximation method wherein a first set of dimensions is calculated using the most significant drag coefficient factor, and these dimensions are then corrected successively to take account of each further significant factor.

In a valve of the general construction defined above, there are five drag coefficients which should be considered in calculating the shape of the valve casing, namely (1) at the entrance to the valve, (2) at the entrance to the valve member, (3) at the exit from the valve member, (4) in the shaped part of the valve casing adjacent which the valve member moves, and (5) at the exit of the valve. For a given velocity of air flow through the entrance to and the exit from the valve, the corresponding drag coefficients are constant, and only the drag coefficients in relation to the valve member and the shaped part of the casing vary with the opening of the valve. Of the latter coefficients, that at the exit from the valve member is most significant, followed by that at the entrance to the valve member. The drag coefficient of the shaped part of the casing may be significant if the extent of axial movement of the valve member is substantial.

DESCRIPTION OF THE PREFERRED EMBODIMENT

Figure 1:
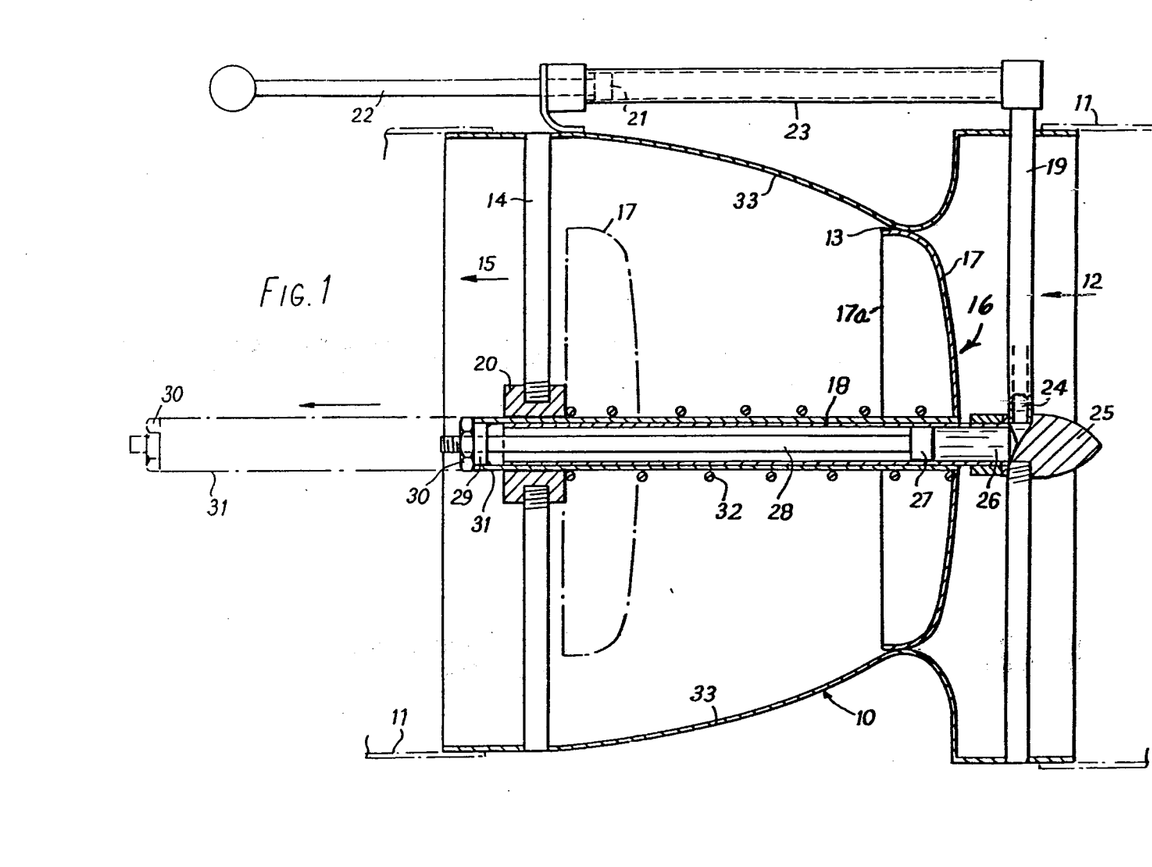
FIG. 1 is a sectional elevation showing a damper valve according to the invention.
Figure 2:
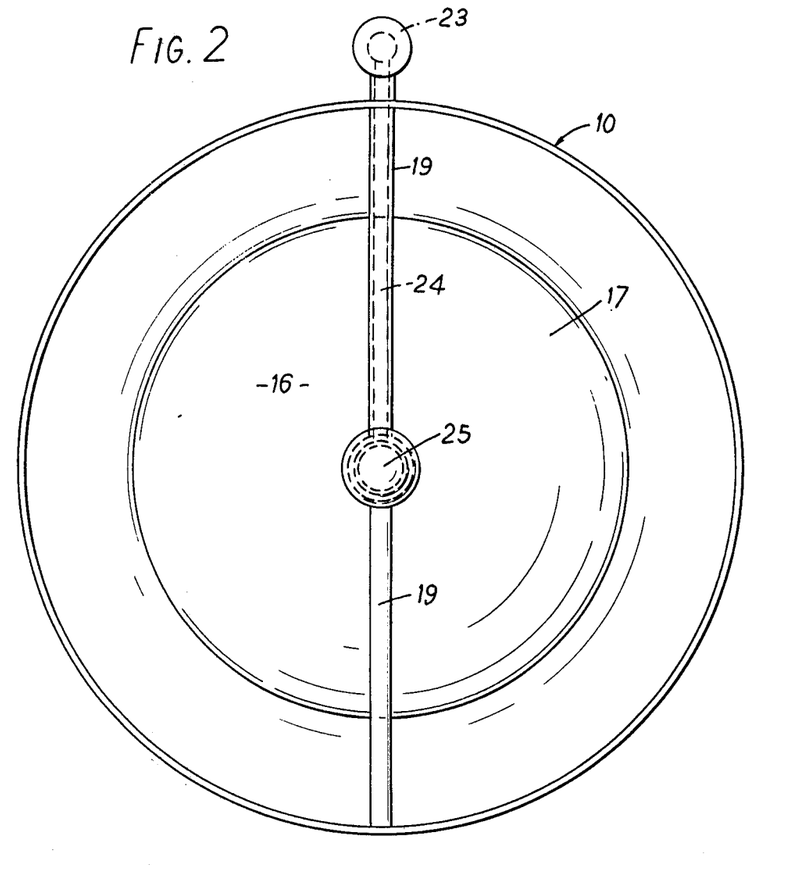
FIG. 2 is a view of the inflow end of the valve.

Referring to FIGS. 1 and 2 of the drawings, the damper valve comprises a casing 10 in an air duct indicated at 11. The casing extends from its inflow end 12 where a valve seating 13 is provided, to a spider 14 at its outflow end 15. A valve member 16 formed from sheet metal to have a convex front face 17 and a concave rear face, is movable along a tubular spindle 18 which extends axially along the casing between the rear spider 14 and another spider 19 at the inflow end 12.

The valve member 16 is movable from a closed position at the valve seating 13, to a fully open position in engagement with hub 20 of the rear spider 14, by means of, in this embodiment, a hydraulic control system. This system comprises a piston 21 which is carried at the end of an actuating rod 22 for movement within a cylinder 23 which is mounted on the casing 10. Hydraulic fluid from cylinder 23 passes through a bore 24 in the upper limb of the front spider 19, to pass through boss 25 of the spider and enter the tubular spindle 18 which provides a cylinder 26.

Piston 27 is movable within the cylinder 26 on one end of a rod 28 which is secured, at its other end, through a tapped disc 29 backed by a lock nut 30, to a tubular sleeve 31. The sleeve is telescopically mounted on the spindle 18 and carries the valve member 16 which is urged towards the closed position by compression spring 32.

Thus, when the rod 22 is displaced to the right, from the position shown in FIG. 1, the valve member 16 is displaced to the left from the solid-line to the broken-line positions shown. If the cylinders 23 and 26 are of the same bore, the two displacements will be the same.

Referring to the section at the inflow end of the valve casing, it is desirable to have the seating 13 curved to approximately the same radius as the peripheral part of the valve member 16, as this has been found to minimise noise and drag.

The shape of the valve casing 10 will now be described, and for simplicity of description the valve illustrated has an inner face 33 which is so shaped, in relation to the characteristics of the valve member 16, that the degree of linear movement of the valve member is directly proportional to the effective degree of valve opening for any given pressure drop through the valve. Thus, for example, if the distance travelled by the valve member 16 in moving from the open position to the fully closed position is 12 cm., and the air flow through the fully open valve is 60 m$^3$ per minute at a given pressure drop across the valve, the air flow through the annular gap between the periphery of the valve member and the casing 33 will be 20 m$^3$ per minute when the valve has moved 8 cm. from the open position at the same pressure drop. In practice a linear response of the valve alone may not however, be desirable, as discussed below.

The shape of the inner face 33 of the valve casing 10 could be determined experimentally, starting from a malleable casing of frustoconical form as indicated by broken lines 36 and forming the casing as required at each one of a substantial number of positions of the valve member 16, by trial and error, following testing of the pressure drop across the valve. Starting with a conical valve in its fully open position, the pressure drop across the valve for a given volumetric flow of air can be determined, and the ideal pressure drop that would occur at each of the positions of the valve member 16 assuming the same volumetric flow of air can be calculated for a valve having the desired characteristics. Adjustment of the contour of the wall surface 33 could then be made with a view to obtaining in practice the desired pressure drop. However, such experimental formation of the valve casing 10 would be impractical and probably imprecise in view of the range of diameters and air velocities or air pressures which must be considered.

In accordance with a further feature of the invention, the desired form of the valve casing can be determined by mathematical correction of an initial form of valve. In considering an initial form of valve from which to start such calculations, it should be noted that the cone angle of an initially shaped frusto-conical casing as indicated by the broken lines 36 should be less than 30°, and preferably in the region of 8°. The diameter of the inflow end of the frustoconical casing should be suited to the velocity of air flow to be encountered, and although as shown in the drawing the narrow end of the casing is of reduced diameter in relation to the ducting 11 within which the valve is to be used, for high velocities the narrow end of the frustum of the cone could correspond directly to the diameter of the ducting 11. In the latter case, the valve casing must necessarily widen outwardly to a diameter greater than that of the ducting, and must be reduced again in diameter at a point sufficiently far beyond the outlet of the valve casing to avoid problems due to turbulence in the valve exit. Assuming that a substantially linear variation in opening of the valve is required from its fully closed to its fully open position, then the cross-sectional area of the wider end of the frustoconical casing should be approximately twice that at its inner end.

It should also be noted that the major central part of the front face of the valve member 17 should be flat or slightly curved, and that the outer skirt of the valve member should be radiused at a smaller radius of curvature as shown, the axial length of the valve member 16 being in the region of ¼ of the distance of axial regulating movement of the valve member. This formation of the valve member is highly effective in deadening noise, such as fan noise, which travels axially along the duct. As seen in FIG. 1, the axial dimension of the valve member 16 is relatively small with respect to the axial dimension of the valve casing 10. As a result, the drag coefficient is defined by a relatively small area of the wall surface 33. Further, the flat front face of the valve member 16 and its radiused outer shoulder enables a formula to be determined for the drag coefficient at the outer peripheral edge of the valve member 16. The valve member 16, as also seen in FIG. 1, has a sharply stepped rear edge 17a enabling the drag coefficient to be determined according to Carnot's equation, as will be discussed in detail below. Reduction of noise levels could be achieved by providing a sleeve of sound deadening material to surround both ends of the duct 11 for a length equal to 3 or 4 times the diameter of the duct.

The method of calculating mathematically the desired correction of the valve surface 33 will now be described in more detail, referring to FIG. 3 in which the revelant dimensions of a valve of the general construction described above are shown.

In a valve of the construction described above the total drag over the valve is made up of the following components.

1. Entrance to the valve

The reduction in cross-sectional area in relation to the duct at the entrance to the valve casing produces a drag coefficient which is however constant with a constant velocity of air flow, and which may be reduced to a minimum by the provision of well rounded corners to the entry to the valve casing and of streamlined spiders for support of the spindle of the valve member.

The drag coefficient appropriate to this part of the valve will hereinafter be designated $\rho_{is}$.

2. Entrance to the valve member

Here, a further area reduction involves a contraction loss, which is dependent of the formation of the valve member 17 and in particular the outer radiused skirt thereof. The drag coefficient of the entrance to the valve member is a variable function of the position of the valve member, and will hereinafter be designated $\rho_i$.

3. Exit of the valve member

At the exit of the valve member a sudden area increase involves vortex and friction losses. The drag coefficient is also a variable function of the position of the valve member and will hereinafter be designated $\rho_u$.

4. Shaped section of the valve casing

Where the overal length L of the part of movement of the valve member 17 is substantial, and the casing converges rapidly, the diverging area containing the valve member and the spindle, hereinafter referred to as the diffuser section, produces a drag coefficient which varies slightly according to the position of the valve member. This drag coefficient is hereinafter referred to as $\rho_d$.

5. Exit of the valve

The drag coefficient at this point may be reduced by streamlining of the spider and support for the spindle of the valve member. The drag coefficient is constant with constant velocity of air flow and will be designated $\rho_{us}$.

From the above it will be seen that of the five major drag coefficients $\rho_i$, $\rho_u$ and $\rho_d$ are variable. The most significant variation in the total drag is due to $\rho_u$, followed by $\rho_i$ and $\rho_d$.

Assuming that the form of the valve throat is required to give a linear relationship between the axial control movement of the valve member and the volume of air flow through the valve at any given constant pressure drop across the valve, the calculation of the correction required to compensate for the variable drag coefficient of the valve can be calculated in terms of the pressure drop required across the valve for a constant volume of air flow through the valve at each control position of the valve member. By considering the pressure drop in relation to constant volume of flow through the valve, the drag coefficients of the inlet and outlet of the valve remain constant and can be disregarded for initial calculations.

In order to derive a table of desired pressure drops for the respective positions of the valve member, firstly the pressure drop across the valve in the fully open position is calculated in relation to an air flow of unit volume through the entry duct to the valve. Since the most significant drag coefficient is $\rho_u$, this pressure drop may be expressed as $$P_u = \zeta_u \cdot v_u^2 \cdot \frac{\gamma}{2} \tag{I}$$

where $P_u$ = pressure drop
$\gamma$ = density of air
$V_u$ = velocity of air flow through the exit from the valve member.

Since the density of air represents a constant, for the purpose of the calculation of relative values of the valve, let $$P_u' = \frac{P_u}{\frac{\gamma}{2}} \tag{II}$$

so that $$P_u' = \rho_u \cdot v_u^2 \tag{II}$$

According to the known "Carnot" equation, the drag coefficient at the outlet from the valve member may be expressed as $$\zeta_u = \left(1 - \frac{A_u}{A_L}\right)^2 \quad \text{(IV)}$$

where
$A_u$ = the area of the annular exit, opening from the valve member, and
$A_L$ = the total area of the exit from the valve casing.

Assuming unit volume of flow $v_L$ through the entry duct to the valve, $$v_u = \frac{v_L \times A_L}{A_u} \quad \text{(V)}$$

Thus, the pressure drop $P_{u}'_{(L=1)}$ at the fully open position of the valve can be expressed as follows:

$$P'_{u(L=1)} = \left(1 - \frac{A_{u(L=1)}}{A_L}\right)^2 \times \left(\frac{V_L \times A_L}{A_{u(L=1)}}\right)^2 \quad \text{(VI)}$$

2. From the initially determined pressure drop of the fully open valve, the desired pressure drops for each position of the valve member can be calculated from the following formula:

$$P_u' = 1/L^2 \quad \text{(VII)}$$

wherein L = the fraction of movement of the valve member from its closed position.

3. Having determined a table of wanted pressure drops, the corresponding area of the exit from the valve member and thus radial dimension ru of the valve casing at the exit from the valve member in corresponding positions of the latter can be calculated in relation to the desired pressure drop from the above formula (VI), using a successive approximation method.

4. Having derived a first correction for the contour of the valve casing, a calculation is now made of the pressure drop due to the drag coefficient for the entrance part of the valve member, in the respective positions of the valve member. The formula for pressure drop at the entrance to the valve member can be derived in a similar manner to that for the exit valve member and is as follows:

$$P_i' = \rho_i \times v_u^2. \quad \text{(VIII)}$$

Figure 3:
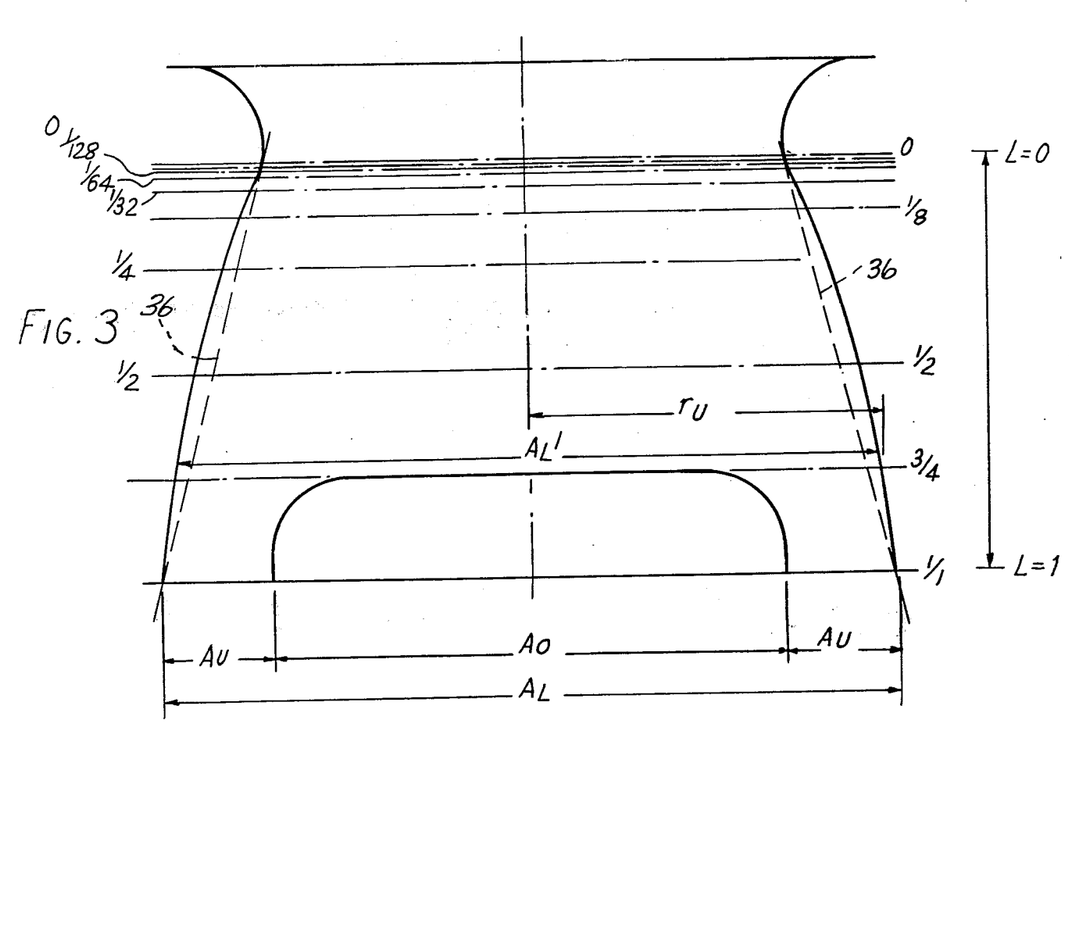
FIG. 3 is a diagrammatic view showing the cross-sections of the valve casing which are referred to in the calculations subsequently followed herein.

From the form of valve member illustrated in FIG. 3, the following formula can be established for drag coefficient:

$$\zeta_i = 0.05\left(1 - \frac{A_u}{A_L'}\right) \quad \text{(IX)}$$

wherein $A_L'$ is the cross-sectional area of the valve casing at the position of the front face of the valve member.

This holds true for $A_u/A_L' \geq 0.2$
Below this value instability occurs.

5. From the previously established values of $P_u'$ and $P_i'$, the calculation of the actually required pressure drop for the exit part of the valve member in its respective positions can be calculated from the following formula:

$$P'_{wL} = \frac{1}{L^2}(P'_{uL=1} + P'_{iL=1}) - P'_iL \quad \text{(X)}$$

6. The radial dimension ru of the valve casing at the respective axial positions can now be recorrected using $P'_{wL}$ in place of $P_u'$ in formula (VI)

7. Further corrections of $A_u$ ($r_u$) are now made in the unstable distance $A_u/A_L < 0.2$ or in this case for the positions 1/16, 1/32, 1/64, 1/128 these corrections are determined experimentally.

8. Further corrections are made after calculation for pressure drop along the diffuser part of the valve casing; derived from Carnot's equation:

$$\zeta_d = 0.3\left[1 - \left(\frac{A_O}{A_L}\right)^2\right] \quad \text{(XI)}$$

where $A_O$ = the cross-sectional area of the valve member.

8. Finally, the contributions to the drag which derive from the inlet and outlet parts of the valve are added to calculate the total drag over the valve.

EXAMPLE

In a specific Example of valve as shown in FIG. 3 and corrected by the above methods, the valve casing had a circular cross-section with maximum internal diameter 156 mm, a valve member had an external diameter of 108 m and a regulating distance of movement of 90 mm with an axial dimension of 22.5 mm and an outer skirt of radius 22.5 mm, and the radial dimension ru of the valve casing at each axial position L of the exit part of the valve casing was as follows:

| L | Ru (mm) |
| --- | --- |
| 1/1 | 78 |
| 3/4 | 74.31 |
| 1/2 | 69.81 |
| 1/4 | 63.85 |
| 1/8 | 59.82 |
| 1/16 | 57.33 |
| 1/32 | 55.88 |
| 1/64 | 55.03 |
| 1/128 | 54.56 |

Although the above description of the method of determining the shape of the valve casing has referred, for simplicity, to the production of a valve having a desired linear relationship between the movement of the valve member and the change in volume of air flow at a predetermined pressure drop, this is not necessarily desirable, as mentioned above. In a system comprising a length of ducting arranged between an air source and the valve, the system will, as known, comprise a $\beta$ value;

$$\beta = Pv/Ps$$

where Pv is the pressure drop across the valve and Ps is the pressure drop across the combination of the duct and valve. In supply ducts of conventional ventilating systems including control valves the $\beta$ value may be as low as 0.09, which considerably modifies the response of a valve which, alone, has a linear response.

Figure 4:
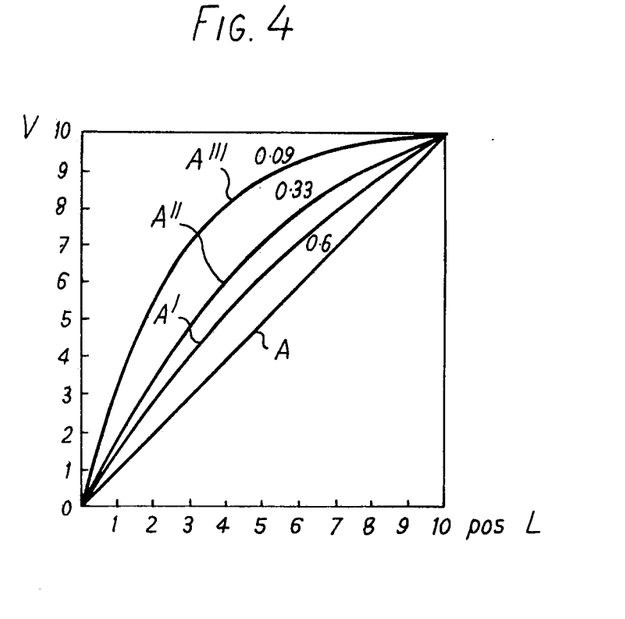
FIG. 4 is a diagram showing the relationship between valve opening and volume of air flow in a valve according to the invention.

For example, FIG. 4 illustrates curves of the change in volume flow of air V in relation to the control movement of the valve member L in the case of a valve as described above, wherein curve A illustrates the response of the valve alone for a given pressure drop across the valve, and curves A', A", A''' illustrate response curves in relation to the same pressure drop across the system when the valve is incorporated in systems having various $\beta$ values.

In order to compensate for a predetermined $\beta$ value, therefore, the valve described above must be recompensated by carrying out the above steps of successive approximation in relation to a different set of wanted pressure values corrected to take account of the $\beta$ value. This may be carried out either during the initial stages of calculation, or starting from the figures derived in the case of a valve already compensated to a linear response.

Figure 5:
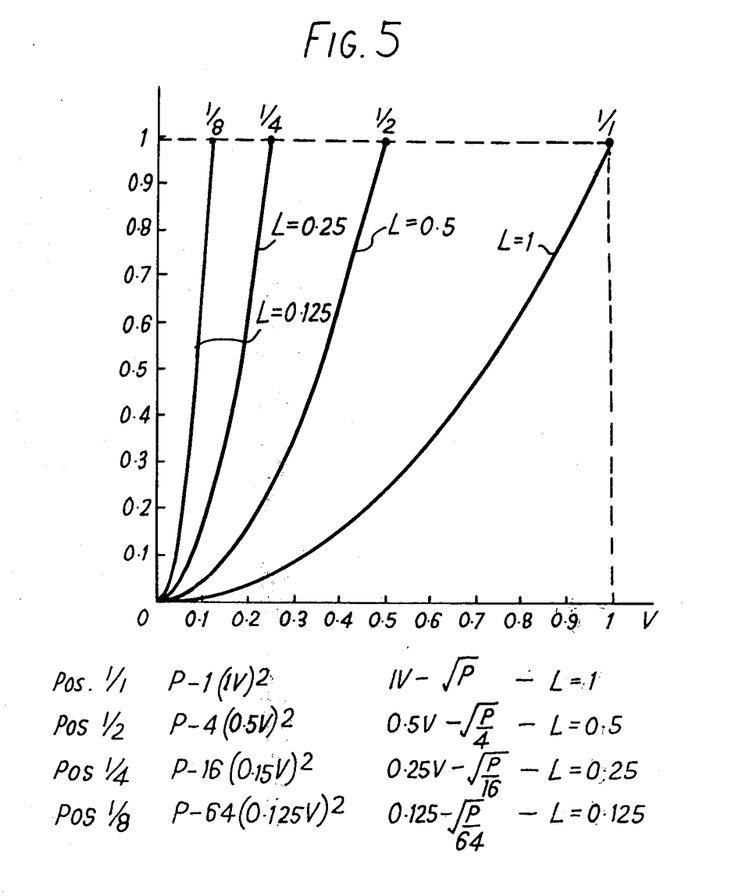
FIG. 5 is a diagram showing operation curves of a ventilation system including a valve in accordance with the invention.

When the response of a valve as described is matched to the $\beta$ value of a given system, the response of the system may be corrected to be linear, and FIG. 5 shows operation curves for such a system, wherein P is the pressure drop across the system, V is the volume of air flow through the valve and curves L, L', L", etc. indicate given setting positions of the valve member. Such operation curves may be utilised to derive air flow measurements in such a system in use, at corresponding setting positions of the valve, simply by taking pressure measurements in selected setting positions and reading the corresponding air flow value from the graph. Alternatively the functions of the respective curves may be stored in a suitable automatic control system for the ventilation system.

The valves according to the invention have the obvious advantage of simplicity in operation and control, and this is particularly attractive to conditions of remote control and to the operation of valves in balance, for example, in ventilating systems where inlet and exhaust valves are coupled to operate in unison, or where hot and cold air flows are mixed in inverse proportions.

Another application of the valve is in controlling air flow pressures and maintaining such pressures at constant values.

A further attraction of the valve described above is that the flow is always around the periphery of the valve member 16 and thus remote from the centre of the air duct where the flow speed tends to be greatest. As a result, the noise level in operation is minimised, as opposed to, for example, iris valves where high-speed central gas flow may product high noise levels, particularly in the lower range of valve openings.

What is claimed is:

1. A valve for controlling air flow through ducting, comprising an axially extending valve casing having opposite first and second end portions for connection respectively to ducting through which the air flow is to be controlled, said first end portion being upstream of said second end portion as viewed in the direction of air flow; said casing further having an axial air inlet and an axial air outlet, said second end portion constituting said air outlet; and a flared inner face widening continuously from said air inlet to said air outlet, whereby the cross-sectional area of said valve casing continuously increases from said air inlet to said air outlet; the maximum of said cross-sectional area of said valve casing being identical to the cross-sectional area of the ducting to which said valve casing is connected; a disc-shaped valve member mounted coaxially within said valve casing for axial movement relatively to said valve casing to vary the area of a valve opening defined between the outer periphery of said valve member and said inner face; said valve casing providing a substantially unobstructed axial air flow passage from said air inlet to said valve opening and from said valve opening to said air outlet; the axial length of said valve member being small in relation to the axial length of said inner face; said valve member comprising a generally flat front face directed towards said air inlet, a more sharply curved peripheral shoulder extending outwardly and rearwardly from said front face to define a radiused entry to said valve opening, and a rear edge bounding the outer periphery of the valve member to define a stepped exit from said valve opening; and operating means for setting said valve member in any selected position substantially along the entire path between said air inlet and said air outlet; the shape of said inner face of the valve casing being such that the variation in the area of said valve opening with axial movement of said valve member compensates for the corresponding variation in the drag coefficients due to said more sharply curved shoulder, said rear edge of the valve member and the portion of the inner face of the valve casing forming the valve opening, whereby for any given pressure drop across a combination of duct and valve, the variation in the volume of air flow in relation to the position of said valve member is linear.

2. An air flow control valve as claimed in claim 1, wherein the said valve casing has a valve seating at the air inlet and the said valve member is arranged for movement into engagement with said seating to fully close the valve.

3. An air flow control valve as claimed in claim 1, wherein said casing and said valve member are of circular cross-section.

4. An air flow control valve as claimed in claim 1, wherein said valve member is mounted on a central spindle which extends axially between the end portions of the valve casing.

5. An air flow control valve as claimed in claim 4, wherein said valve member is movable by means of a hydraulic control system including a piston-and-cylinder device provided in said spindle; said hydraulic control system forming part of said operating means.

6. An air flow control valve as claimed in claim 3, wherein the shape of said valve casing is such that the angle of the apex of an imaginary cone, the central axis of which corresponds with the axis of movement of said valve member and which touches the peripheries of said inflow and air inlet and air outlet of said casing is less than 30°.

7. An air flow control valve as claimed in claim 6, wherein said apex angle is approximately 8°.

8. An air flow control valve as claimed in claim 2, wherein the cross-sectional area of said air inlet of said valve casing is approximately one half of the cross-sectional area of the said air outlet.

9. An air flow control valve as claimed in claim 8, wherein the maximum cross-sectional area of said valve member is approximately the same as the cross-sectional area of said air inlet of the valve casing.

10. An air flow control valve as claimed in claim 1, wherein the axial length of said valve member is approximately $\frac{1}{4}$ of the axial length of the said valve casing.

* * * * *